United States Patent [19]

Gelula

[11] Patent Number: 4,597,354
[45] Date of Patent: Jul. 1, 1986

[54] COUPLING SYSTEM WITH LOCK

[76] Inventor: Jerome D. Gelula, 535 E. 86th St., New York, N.Y. 10028

[21] Appl. No.: 626,558

[22] Filed: Jun. 29, 1984

[51] Int. Cl.⁴ .............. B63B 17/00; B63B 21/04; B63H 16/06
[52] U.S. Cl. ..................... 114/343; 24/645; 114/230; 114/364; 114/378; 403/141; 440/53; 440/109
[58] Field of Search .............. 440/108, 109, 53; 114/93, 378, 380, 249, 250, 343, 364; 24/115 L, 136 A, 645; 403/141, 144, 122; 292/49, 50; 70/123, 211; 280/435–437, 511–512

[56] References Cited

U.S. PATENT DOCUMENTS

| | | | |
|---|---|---|---|
| 1,301,392 | 4/1919 | Corser | 114/380 |
| 1,958,008 | 5/1934 | MacDougall | 440/109 X |
| 2,429,532 | 10/1947 | Stephen | 280/436 |
| 2,990,711 | 4/1961 | Savage | 70/211 |
| 4,236,476 | 12/1980 | Solf et al. | 114/91 |
| 4,361,939 | 12/1982 | Gelula et al. | 24/645 |
| 4,444,410 | 4/1984 | Martin | 280/511 |

*Primary Examiner*—Sherman D. Basinger
*Attorney, Agent, or Firm*—Paul J. Sutton

[57] ABSTRACT

The present system discloses an improved self-aligning quick release coupling system capable of releasably joining any two or more of a great variety of male/female mating items to be joined at the option of the user. This improved system includes a lock and key system that provides capability for the coupling system to be safely locked into the coupling mode or released from the coupling mode. The system includes a male connecting member having a securing end. The supporting structure, or housing, can be positioned in the side walls of a small boat and the securing end of the male connecting member connected to an oar on a securing rope. A ball member of the male connecting member is freely rotatable between the female mating members positioned in the housing so as to provide rowing and free riding, tying and lifting capabilities.

13 Claims, 13 Drawing Figures

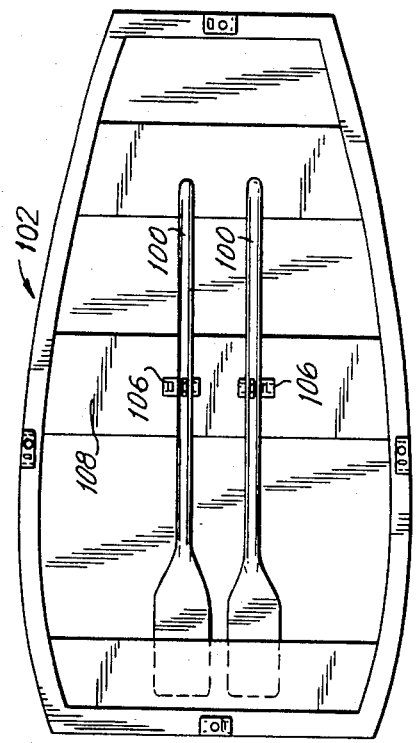
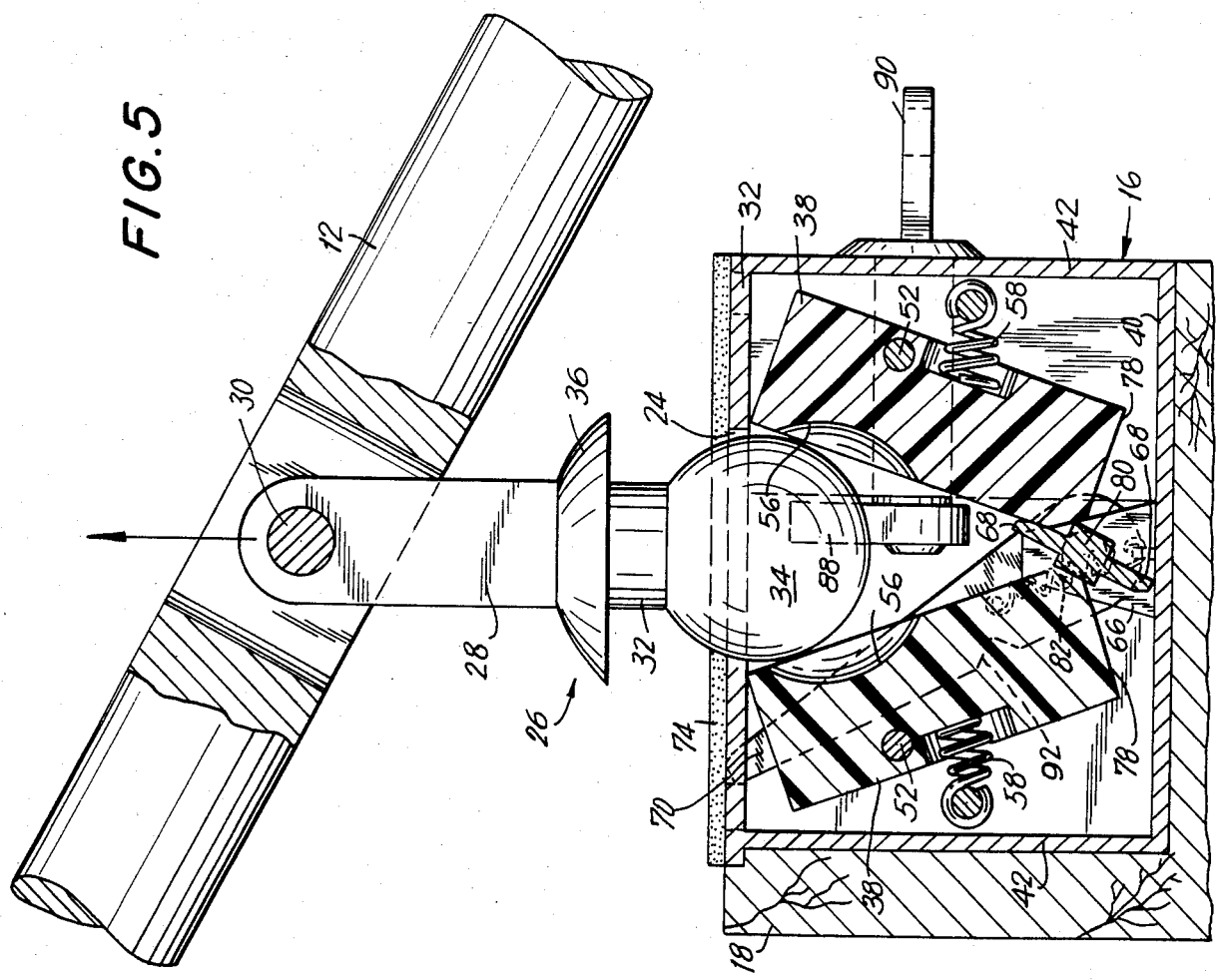

COUPLING SYSTEM WITH LOCK

The present invention relates generally to couplings and more generally to a latching system capable of use in various environments. In particular, the present system is an improved system over the systems generally described in my U.S. Pat. No. 4,361,939 issued Dec. 7, 1982 and entitled "Coupling System."

The present invention is directed to unique features particularly useful in marine environments, more particularly for use with small boats such as rowboats. Locking devices as described in my U.S. Pat. No. 4,361,939 have proven themselves in practical applications. No prior use, however, has been directed to marine environments. Also, no prior use has mentioned that such coupling systems can be locked into place by a key. Also, the securing aspects of such systems previously described have not included securing devices that would prevent a decoupling either by accident or by unauthorized persons.

It is a primary object of the present invention to provide a coupling system that includes positive latching of male and female members and a lock and key system for securing the latching of the male and female members against accidental or unauthorized decoupling.

It is yet another object of the present system to provide a coupling system that provides a lever member secured to a cam member for positively separating a pair of female locking members and a stop member operable by a lock member and key system for holding the lever member and thus the cam member in locking mode positions.

Still another object of the present invention is to provide a coupling system that includes a housing holding female locking means that are positioned in the gun wales of a rowboat and a male connecting member including a spherical ball member connected to an oar or a tie rope, the ball member being freely rotatable in the housing so that the boat can be rowed or tied to a ship so that the boat can freely ride on the water while tied to the ship.

In accordance with the above objects and in order to provide certain needed improvements over the type of coupling system I am generally concerned with here, and as I generally discussed in my U.S. Pat. No. 4,361,939, I describe here an improved latching system that comprises as a combination a supporting structure; at least one captive member supported for movement between capturing and releasing positions by the supporting structure; first spring means carried by the supporting structure normally biasing the capture members towards the releasing position; a locking member for the capture member supported for movement between interfering and non-interfering positions by the supporting structure, wherein in the interfering position the capture member is in the capturing position and in the non-interfering position the captive member is in the releasing position; lever means carried by the supporting structure and connected to the locking member and capable of movement between first and second positions wherein in the first position the locking member is in the interfering position and in the second position the locking member is in the non-interfering position; second spring means carried by the supporting structure for normally biasing the lever means towards the first and second positions; connector means adapted to be releasably captured by the capture member; key lock means supported for rotational movement by the supporting structure; stop means integral with the key lock means capable of movement between holding and non-holding positions, wherein in the holding position the stop means holds the lever means in the first position; and key means capable of being inserted into the key lock means for moving the stop means between the holding and non-holding position. The one captive member can include a pair of capture members forming generally facing hollow portions and where said connector means includes a ball member capable of being captured in the hollow portions, the ball member being freely rotatable over a 360 degree arc.

This basic structure I have just described can be applied to a number of uses, but it is particularly applicable to certain marine environments. In particular, a small boat, such as a rowboat, can have the support structure described above positioned, or embedded, in at least one of its gun wales as an oarlock. In addition, the connector means can be adapted to be inserted into the oarlock as an oar pin, or thole pin. The connecting member can include a top connecting means opposite the ball member so that the top connecting means can be secured to an outside member. The top connecting means includes a connector portion that forms at least one aperture. The one aperture can include a pair of spaced apertures that support a pivot pin that in turn rotatably supports an oar. A tie rope connected to a lifting hook or a ship can be positioned in the at least one aperture.

The foregoing objects and features of the present invention will become more apparent from a reading of the following technical specification wherein similar reference characters are used in conjunction with the several views of the drawings.

DESCRIPTION OF THE DRAWINGS

FIG. 5 is a transverse sectional side view of the coupling system shown in FIG. 3 in the unlocked mode;

FIG. 6 is a top view of a row boat showing a pair of oars gripped by a pair of coupling systems in the seat of a row boat;

DESCRIPTION OF THE PREFERRED EMBODIMENTS

Reference is now made in detail to the drawings.

Figure 1:
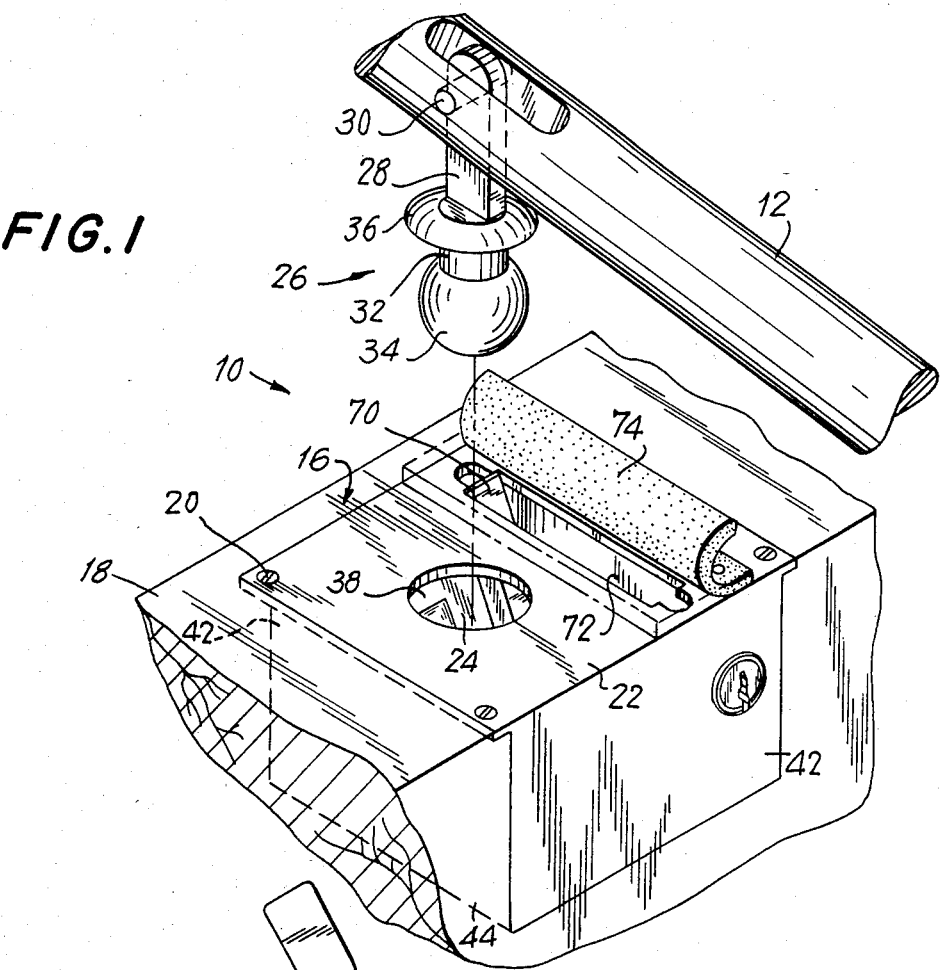
FIG. 1 is a perspective view of the coupling ball and oar raised from the support structure embodiment in the side of a row boat.
Figure 2:
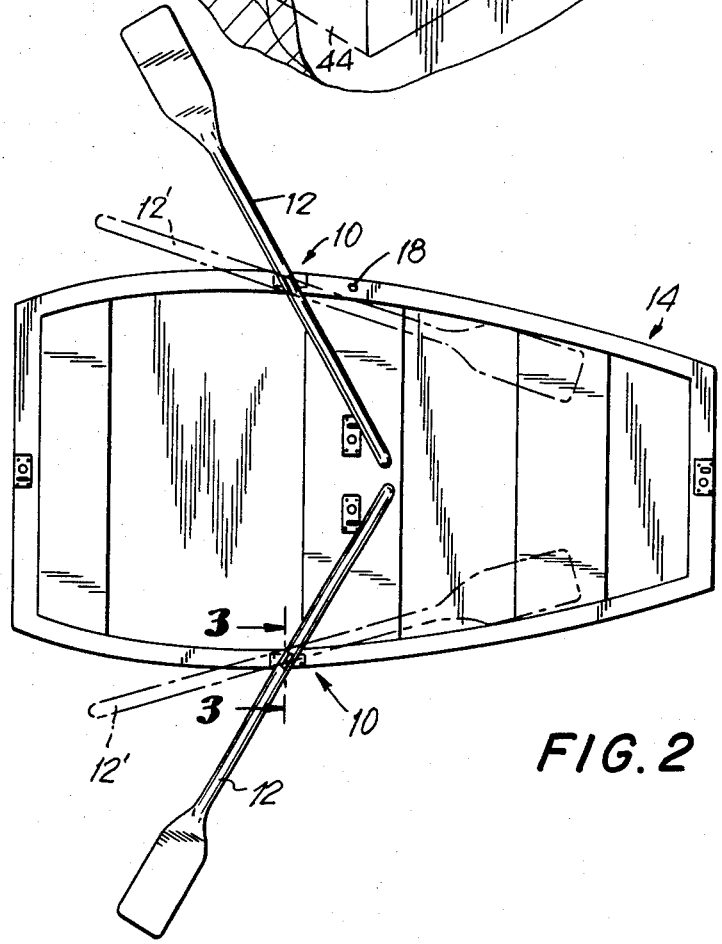
FIG. 2 is a top view of the row boat seen in FIG. 1 showing a pair of oars connected to the quick-release coupling system in the sides of the row boat.

A latching system 10 is shown in perspective view in FIG. 1 as applied to the oar 12 of a rowboat 14 as seen in FIG. 2. A support structure, or housing, 16 is inserted in the top rim, or gun wale, of side 18 of the rowboat to which the housing is secured by screws 20. Housing 16 has a top wall 22 which forms a circular hole 24. A male connector or member 26 is connected to oar 12 at a position commonly used as a pivot point for rowing operations. Male connector member 26 includes a top connecting portion 28 that is set at one end to an aperture in oar 12 to which it is hinged by a horizontal pivot pin 30, which allows oar 12 to be rotated up and down around the pin. Male connector member 26 also includes a shaft portion 32 connected at its top end to top connecting portion 28 and at its bottom end to a male ball member 34. A skirt 36 extending outwardly from shaft portion 32 provides a seating or positioning capacity for male connector member 26; because the skirt has a larger diameter than hole 24 it will be held against the top surface of top wall 22 when ball member 34 has been dropped through hole 24.

Figure 4:
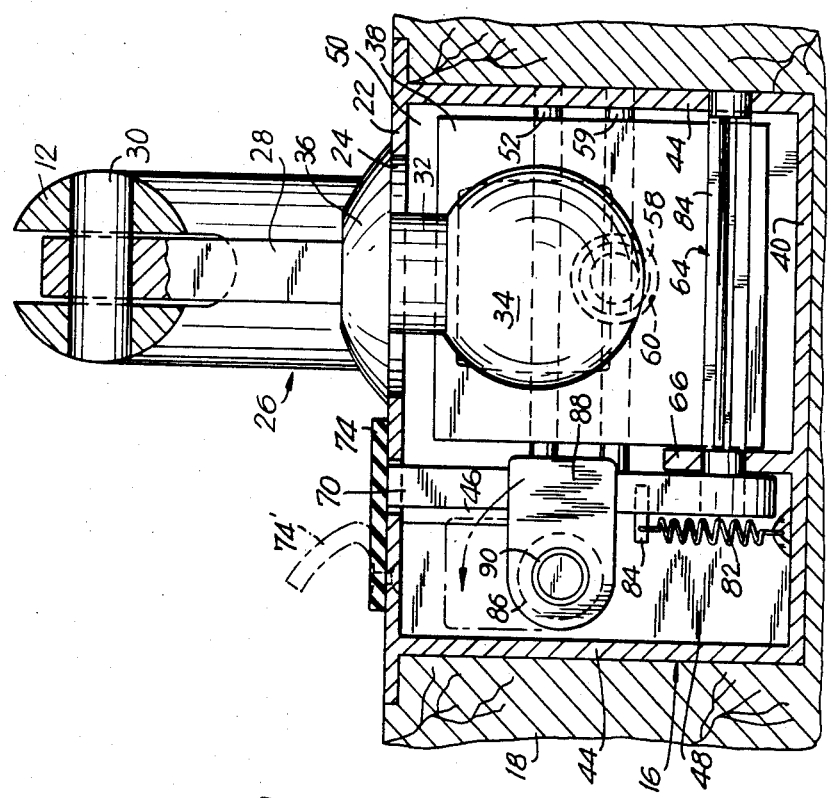
FIG. 4 is a sectional side view taken through line 4—4 of FIG. 3.
Figure 3:
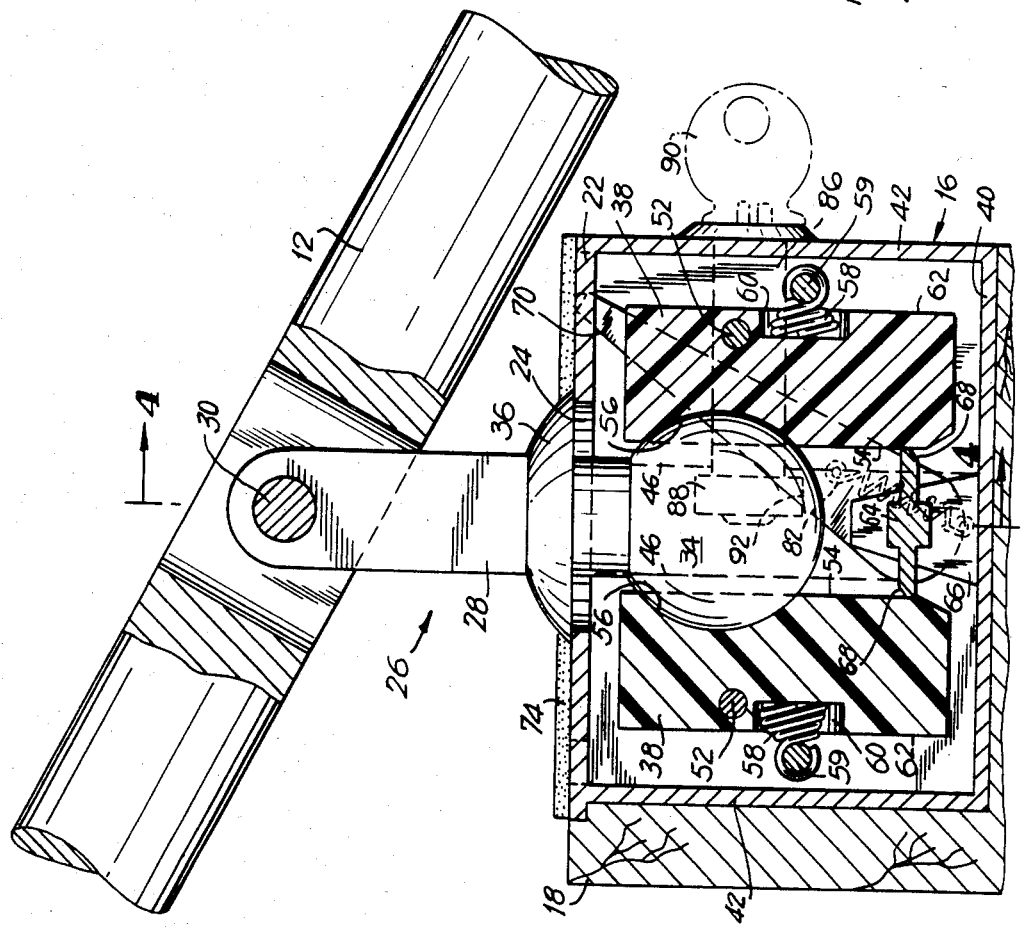
FIG. 3 is a transverse sectional side view of the coupling system with the oars seen in FIGS. 1 and 2, with the coupling system in the locked mode.

Attention is now directed to FIGS. 3 and 4 in which male ball member 34 is shown in a captured position between a pair of opposed elongated female locking members 38. Housing 16, besides top wall 22 previously mentioned, includes a bottom wall 40, a pair of opposed vertical side walls 42, and a pair of opposed vertical end walls 44 secured to top and bottom walls 22 and 40. Sidewalls 42 are lateral to the opposed side surface of side 18 of rowboat 14. A vertical intermediate wall 46 positioned between and generally parallel to end walls 44 is secured to end walls 42 so as to divide housing 16 into a first transverse enclosure 48 and a second transverse enclosure 50 shown to the left and right respectively as part of housing 16 in FIG. 4. Intermediate wall 46 forms a central vertical aperture for a reason to be explained later.

Locking members 38 are rotatably mounted by a pair of cylindrical pivot pins 52 that extend across second enclosure 50 and are connected to intermediate wall 46 and one end wall 44 shown to the right in FIG. 4. Locking members 38 having facing inner walls 54 in which are formed respective hollows 56 which are adapted to receive opposite sides of ball member 34 so as to hold the ball member in a captured position. The lower portions of locking members 38 are urged toward one another by compression springs 58 each of which has an end looped about a respective spring pin 59 which, like pivot pins 52 of locking member 38, are secured to intermediate wall 46 and one end wall 44 in second enclosure 50. Spring pin 59 is closer to the bottom wall 40 of housing 16 than are pivot pins 52 so that the pressure exerted by springs 58 against the outer walls of locking members 38 causes rotation of locking members 38 about pins 52 with the lower portions of the locking members 38 proximate bottom wall 40 being mutually urged toward one another while the upper portions of locking members 38 distal from bottom wall 40 being mutually urged away from one another. Circular recesses 60 formed in outer walls 62 of locking members 38 have a diameter slightly larger than the largest diameter of springs 58 so as to receive the ends of springs 58 and so as to prevent substantial lateral movement of springs 58 in a plane parallel to locking member outer walls 62, which are opposed to inner walls 54.

A cam member 64 is transversely disposed intermediately between the lower portions of locking members 38 in second enclosure 50 for maintaining locking members 38 in mutual parallel disposition, that is, with opposed faces 54 in mutual parallel disposition to one another. Cam member 64 is spaced from bottom wall 40 of housing 16 and is pivotably mounted in second chamber 50 generally parallel to pivot pins 52 of locking member 38 and is pivotably supported at one end at wall 44 as seen in FIG. 4 at a pivot connector and at the other end at a wall segment 66 extending upwardly from bottom wall 40 and spaced to the right of intermediate wall 46 as seen in FIG. 4.

As seen most clearly in FIG. 3, cam member 64 includes a pair of opposed fingers 68 that are disposed generally parallel to bottom wall 40 of housing 16. The tips of each of fingers 68 are in wedged contact with inner walls 54 of locking members 38 so that locking members 38 are pressed apart against the bias of their springs 58. This wedging contact or pressure results in inner walls 54 of locking members 38 being held apart in spaced generally vertically parallel relationship so that compression springs 58 are pressed into a biased mode.

Latching system 10 is shown in its locked mode in FIGS. 3 and 4. A locking lever 70 shown in its locking position in first enclosure 48 of housing 16 adjacent to intermediate wall 46 extends at an angle between side walls 42 and generally parallel to end walls 44. The top end of lever 20 lies proximate to top wall 22 spaced from a side wall 42 and extends slightly through an elongated aperture 72 formed in top wall 22. Top wall 22 is covered by a flexible, water-resistant covering 74 that is secured along one edge of aperture 72 so that it can be rolled away from aperture 72 as shown in FIG. 1 and in a closed position in FIGS. 3 and 4 and in its rolled back position in phantom lines and indicated as 74 in FIG. 4. The lower portion of lever 70 is affixed to the inner end of cam member 64 which extends through wall segment 66. Lever 70 as shown in FIGS. 3 and 4 is in a locked position wherein cam member 64 has been extended with its fingers 68 generally parallel to bottom wall 40 and in pressing engagement with inner walls 54 of locking members 38 so that ball member 34 is locked into a captured mode in hollows 56.

FIG. 5 shows latching system 10 in its unlocked mode. Locking lever 70 is shown in its unlocking position with its top end proximate to top wall 22 spaced from the side wall 42 opposite from the side wall 42 at which it was positioned in its locking position shown in FIGS. 3 and 4. Cam member 64 has been rotated from its prior locking position to an unlocking position wherein its fingers 68 are angled upwardly and downwardly and out of pressing engagement with locking members 38 so that springs 58 have biased the bottom portions of locking members 38 towards one another and thus moved the upper portions of locking members 38 away from one another so that in turn ball member 34 is freed from its locking engagement, or captive mode, in hollows 56. The bottom portions of facing inner walls 54 of locking members 38 form facing bevels 76 with bottom walls 78 so as to provide blocking surfaces for cam member 64, which, as is shown in FIGS. 3, 4, and 5, has its central portion configured as an elongated rectangular portion 80. The blocking surfaces of rectangular portion 80 intercept bevels 76 in order to prevent the lower surfaces of locking members 38 from being pressed together by biasing action of springs 58 when system 10 is in the unlocked mode as seen in FIG. 5.

An expansion spring 82 seen in FIGS. 3, 4 and 5 has one end secured to bottom wall 40 of housin 16 in first enclosure 48 and extends generally upwardly to attachment at its other end to a support pin 84 that extends horizontally outwardly from lever 70 towards end wall 44 at first enclosure 48. Support pin 84 is positioned at the bottom portion of lever 70. In both the locked and unlocked modes of system 10 as shown in FIGS. 3 and 4 and in FIG. 5 respectively spring 82 is partly biased so as to hold lever 70 in whichever of the two positions it is positioned. As lever 70 is moved by an operator from the unlocked mode to the locked mode, or vice-versa, lever 70 will be moved against the bias of expansion spring 82 so as to further extend the spring and move it further into bias to a maximum bias at the midway point of the movement (not shown). Thus, lever 70 is held in either its unlocking or locking position by spring 82.

A rotatable key lock member 86 forming a keyway extends transversely from side wall 42, which as shown is the outside wall of towboat 14, through second enclosure 50 to a position adjacent lever 70 when lever 70 is in its locking position as seen in FIG. 3. A locking bar, or pawl, 88 affixed to the end of key lock member 86 is rotatably movable by way of a key 90 being inserted into the circular keyway of key lock member 86 and turned so that pawl 88 can be moved into horizontal blocking engagement with lever 70 at a notch 92 formed on the side of lever 70 facing pawl 88 and adapted to receive pawl 88. Similarly, key 90 can be turned so as to rotate pawl 88 upwardly as seen in FIGS. 4 and 5 so as to release lever 70 from its locking position and allow the operator to move lever 70 to its unlocking position as seen in FIG. 5. It is noted here that during the movement of lever 70 between its locking and unlocking positions, the top end of lever 70 extends part top wall 22 in elongated hole 24. As explained before, this latter movement rotates cam member 64 so as to free compression springs 58 for biasing the bottom portions of locking members 38 towards one another so as to free ball member 34 in hollows 56.

In operation, when latching system 10 is in its unlocked mode as seen in FIG. 5, key 90 is placed into the keyway of key lock member 86 and ball member 34 is placed through circular hole 24 between locking members 38 into hollows 56. This action alone will tend to move locking members 38 apart against the bias of compression springs 58 so that ball member 34 is captured by locking members 38 as long as the operator presses down upon ball member 34. At this point, lever 70 is shifted from its unlocking position as seen in FIG. 5 to its locking position as seen in FIGS. 3 and 4. This movement also rotates cam member 64 from its generally up and down position seen in FIG. 5 to its generally horizontal position seen in FIGS. 3 and 4 so that locking members 38 are kept pressed apart at their lower portions so as to keep ball member 34 captured in hollows 56. Finally, key 90 is rotated so as to turn pawl 88 into restraining relationship with lever 70 at its facing notch 92. Expansion spring 82 will have been moved from its locking bias of FIG. 5 through its maximum resistance to movement where lever 70 reaches its vertical position and stretches spring 82 to its maximum bias to its lesser locking bias of FIGS. 3 and 4. Key 90 is then removed from the keyway of key lock member 86. The operator is then able to move oars 12 freely while at the same time the oars are restrained from vertical movement at the coupling. It is important to note that here an essential aspect of the invention as here is described is made possible, namely, that oars 12 are not only able to rotate up and down about pivot pin 12, but in accordance with the present invention, oars 12 can be freely rotated over a 360 degree area since ball member 34 can be freely rotated over 360 degrees in hollows 56 of locking members 38 since both ball members 34 and hollows 56 are respectively generally spherical and spherical in portion so as to allow ball members 34 to rotate without hinderance while at the same time keeping ball members 34 in a captured position.

It is noted that with regard to the particular application of the invention as shown in FIGS. 1–5, male connector member 26 is analogous to a thole pin of an oar, and housing 16 is analogous to an oarlock for receiving the thole pin. The thole pin, or male remember 26, is the fulcrum about which the oar is levered during rowing operations. Ball member 34 captured in housing 16 increases the efficiency of the operation.

Besides the side oaring arrangement of the present invention as shown in FIGS. 1–5, the invention can be applied to other marine uses as generally shown in FIGS. 6–11.

The same arrangement and construction as shown in FIGS. 1–5 for latching system 10 can be used for stowing oars in a boat as seen in FIG. 6. Here, a pair of oars 100 are stowed lengthwise on a rowboat 102. The handles of oars 100 are provided with a male connector member similar to male connector member 26 of latching system described previously. The male connector member is not shown in FIG. 6 because it lies under oars 100. A pair of housings 106 each similar to housing 16 described previously are positioned in an inserted relationship with center seat 108 of rowboat 102. Housings 106 each contain the elements described above as being contained in housing 16 including female locking members capable of capturing the male member of the male connector levers, and cam members similar to male member 34, lever 70, and cam member 64 described above. Housing 106 is also provided with a key lock member 86 and a key 90 described above. Oars 100 can be set into housing 106 and locked therein until ready for use at which time they can be freed by unlocking the female capturing, or locking, members.

Figure 7:
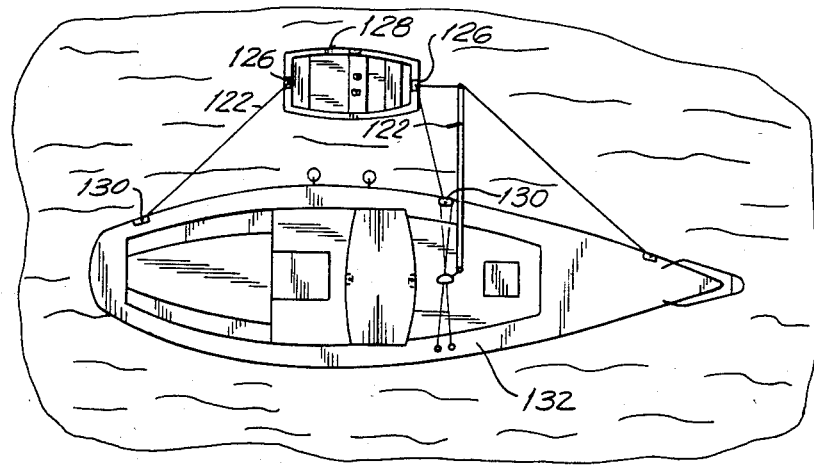
FIG. 7 is a top view of a row boat moored to a yacht by the ropes connected to coupling systems in the walls of a row boat.
Figure 8:
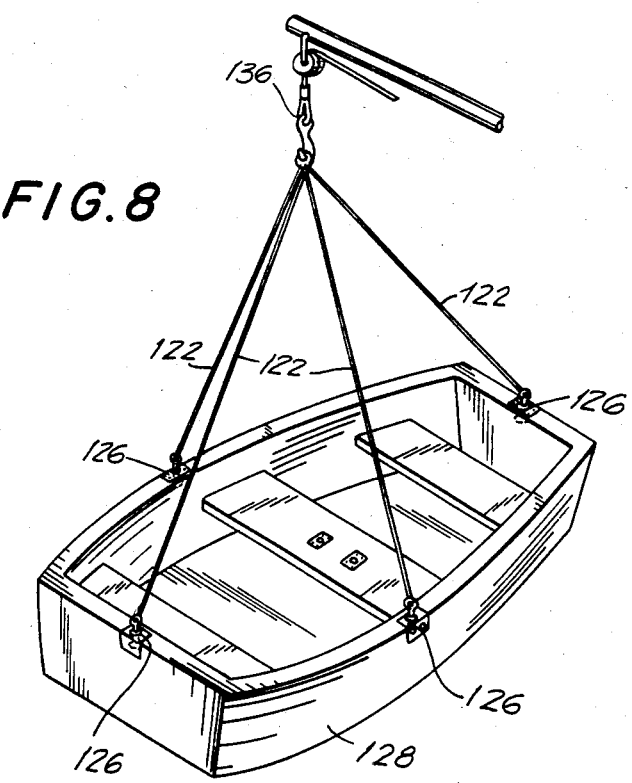
FIG. 8 is a perspective view of a row boat being raised by tie ropes secured to the ends of connector members positioned with coupling systems embedded in the sides and ends of a row boat.
Figure 8A:
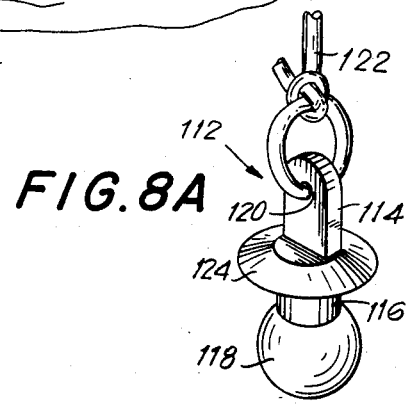
FIG. 8A shows a detail of a tie rope passed through a hole formed at the upper end of a connector member in turn connected to a ball member.

FIGS. 7 and 8 show constructions and arrangements of the present invention wherein the male connector member 26 discussed previously in relation to FIGS. 1–5 has been adapted to receive a rope that connects the male member to another mounting. A male connecting member 112 shown in FIG. 8A includes a top connecting portion 114, a vertical shaft portion 116, and a ball member 118 located at the bottom of the shaft portion. The top of flat top connecting portion 114 forms a horizontal hole 120 that is adapted to hold a connecting rope 122 that in turn is connected to selected objects. A skirt 124 is optionally positioned between top connecting portion 114 and shaft portion 116. As shown in FIG. 7, housings 126 are set into the fore and aft walls of a rowboat which are adapted to receive male connector members 112 in the same manner that housing 16 with its capturing elements before described receives the male connecting member 26 as also previously described. A key lock member and key are likewise included in the latching system as applied to the arrangement shown in FIG. 7. As shown there, one end of a rope 122 is connected to each fore and aft housing 126 of rowboat 128 and the othe end to a pair of stays 130 connected to the sides of a ship 132. Because ball members 118 are able to rotate freely in the lockingmembers in housings 126 and yet are held in housings 126, the rowboat can float freely with the range of ropes 122 while remaining securely attached to ship 132.

Similarly, if two additional side housings 126 are embedded at the opposite sides of rowboat 128 as shown in FIG. 8, and four male connector members 126 with ropes 122 are inserted into housings 126, the other ends of ropes 122 can be gathered at an elevated hook 136 attached to a winch and the rowboat can be neatly lifted from the water.

Figure 9:
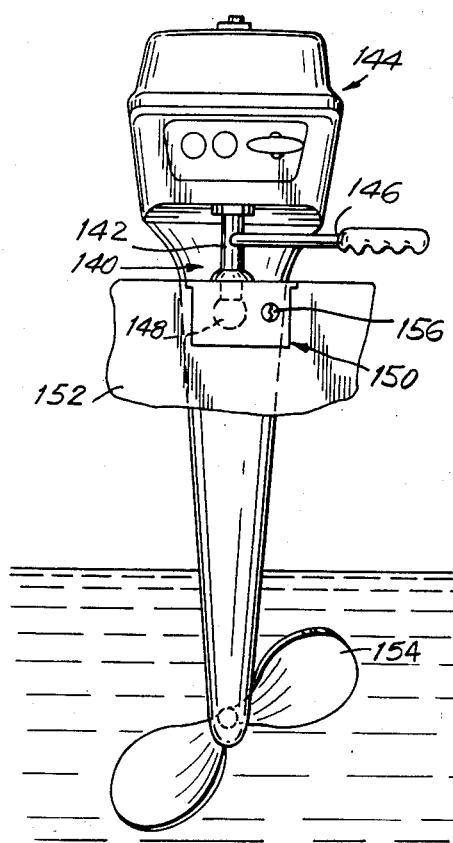
FIG. 9 is a fragmented elevational view of a motor of a motor boat mounted to a coupling system positioned in the stem end of a motor boat.

FIG. 9 shows another application of the latching system of the present invention. A male connector member 140 has a top portion 142 that is affixed to the casing of an outboard motor 144. A control handle 146 is affixed to top portion 142 opposite motor 144. Ball member 148 of male connector member 140 is rotatably captured by the locking members (not shown) positioned in a housing 150 encased into the stern side 152 of a motorboat. The locking member and housing 150 are analogous to locking members 38 and housing 16 described previously with regard to FIGS. 1-5. Because ball member 148 is able to rotate freely between the locking members contained in housing 150, the motorboat can be directed by movement of handle 146 and thus movement of ball member 148 and motor 144 from which extends propeller 154. A key lock member 156 in housing 150 is shown that accepts a key (not shown) for locking or unlocking ball member 148 into or from its captured position.

Figure 10:
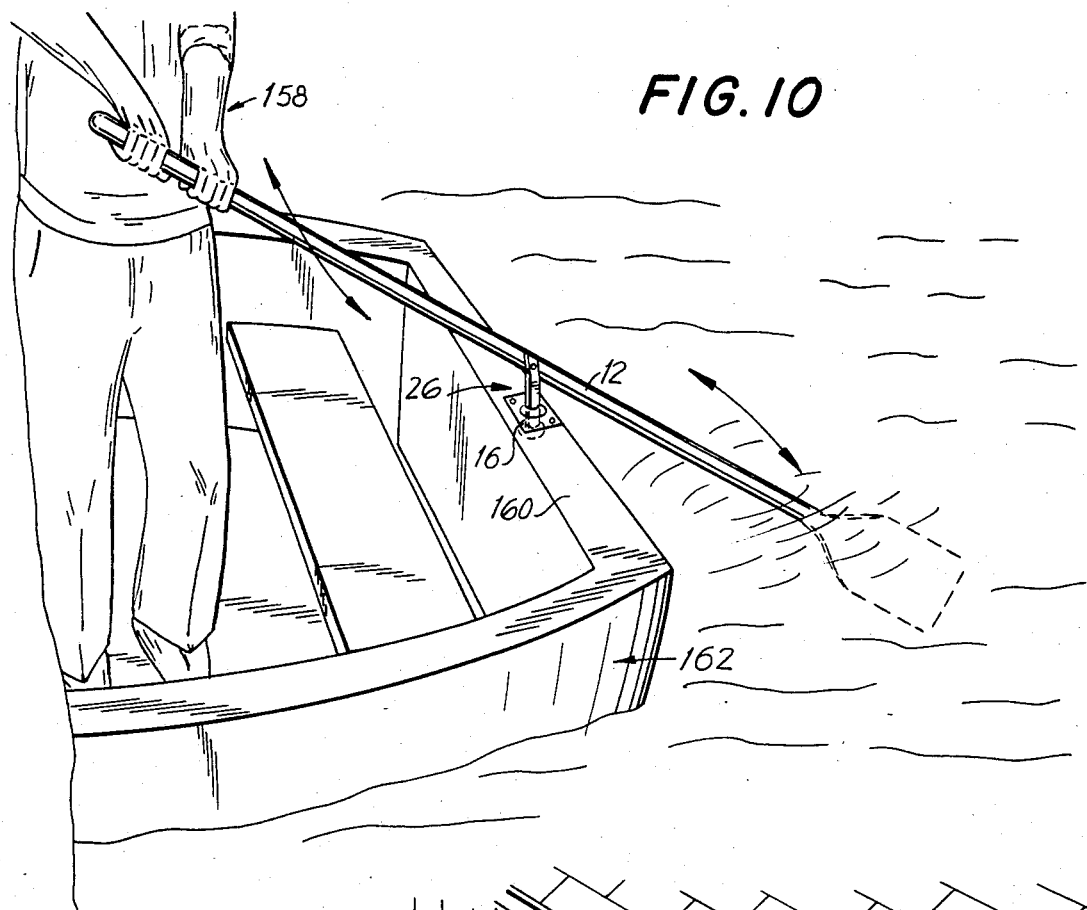
FIG. 10 is a perspective of a sculling oar positioned at the stem of a row boat.

Another application of latching system 10 described earlier with reference to FIGS. 1-5 is shown in FIG. 10 where a housing 16 is encased at the stern end 160 of a rowboat 162 and a male connector member 26 secured to an oar 12 is lockably inserted into housing 16. Oar 12 can be freely moved in sideways and vertical directions while locked to housing 16 so that the operator 158 can scull the rowboat.

Figure 11:
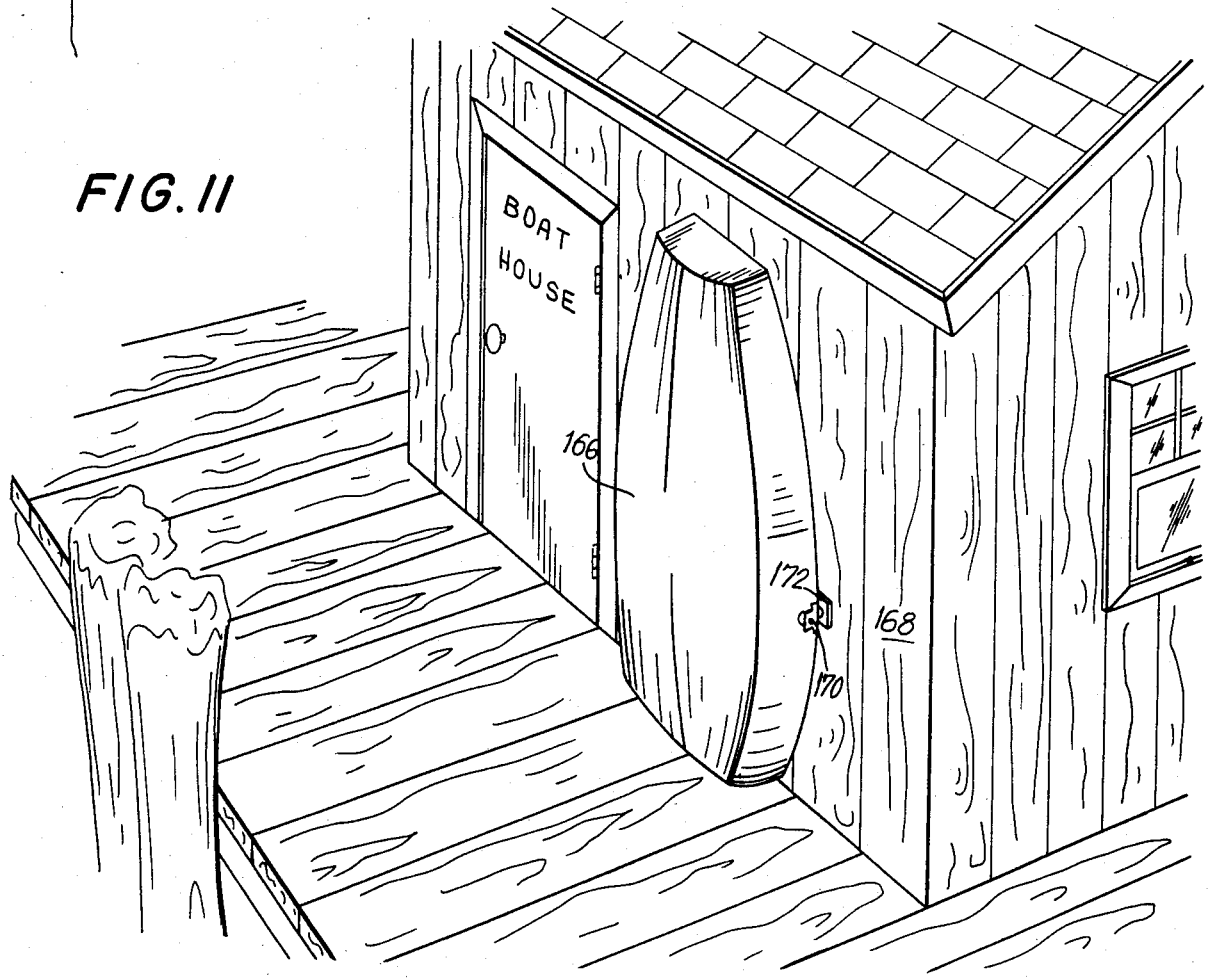
FIG. 11 is a perspective view of a row boat secured to the side of a boat house, the row boat having capture members of the coupling system in the walls of the row boat holding ball members mounted to the wall of a boat house.

Still another use for the latching system herein described is shown in FIG. 11 where a rowboat 166 is stored by being vertically mounted to a wall 168 of a dockside boathouse. A pair of male connector member 170 (one of which is seen in FIG. 11) analogous to prior described male connector members 26 are encased in wall 168 at a height and spacing adapted to receive a pair of housings 172 (one of which is seen in FIG. 11) connected to the sides 174 of rowboat 166 and extending generally laterally relative to sides 174 and generally parallel one to another. Male connector members 172 are shown inserted into housings 170 where their ball members are gripped by the female locking members (not seen) positioned in housings 170. Each housing 170 has a lock member (not shown) analogous to lock member 86 of FIGS. 1-5 and provided with a rotatable locking pawl analogous to pawl 88 previously described so that rowboat 166 can be locked to wall 168 by a key insertable into the keyway of the lock member which can be removed for later insertion in freeing the rowboat from its locked mode.

Figure 12:
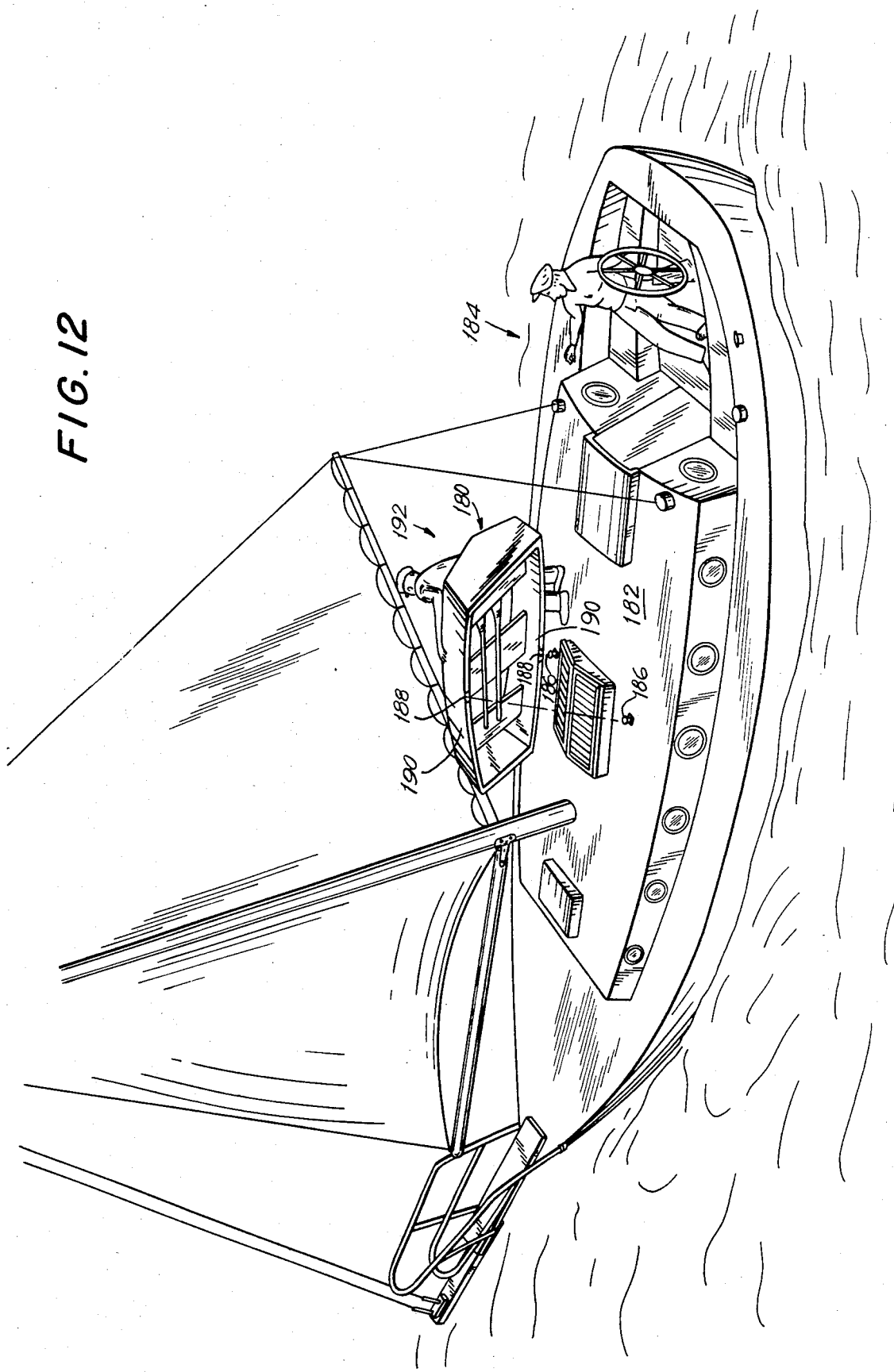
FIG. 12 is a perspective view of a row boat being mounted to the deck of a yacht.

FIG. 12 illustrates how a rowboat 180 can be secured to the deck area 182 of a sailing ship 184. A pair of spaced male connector members 186 shown extending vertically from deck area 182 are adapted to be received by a pair of housings 188 recessed into opposite sides 190 of rowboat 180. Housings 188 are each analogous to the housing 16 described earlier where male connector members 186 can be locked, or captured, by the locking members contained in housing 16 in the manner described for locking members 38. A lock member with a keyway analogous to lock member 86 is provided for each housing 188 so that rowboat 180 can be releasably locked to the deck. As seen in FIG. 12, a sailor 192 is either moving rowboat 180 from or to engagement with male connector members 186. Housings 188 are sufficiently recessed into sides 190 so that an operator can operate the locking levers and insert and remove the keys into and from the keyways in housings 188 in the same construction and arrangement as lever 70 and keyway 86 are built into housing 16 previously described.

The positive latching connector of the invention has been described with reference to several embodiments and applications but it is to be appreciated that there are numerous other applications in which the invention can be used and embodiments of the invention which may differ from the disclosed preferred embodiments of the invention without departing from the spirit and scope of the invention which is defined in the following claims.

What is claimed is:

1. An improved latching system, comprising, in combination,
   a supporting structure,
   a pair of capture members forming generally facing hollow portions, said capture members being supported for movement between capturing and releasing positions by said supporting structure,
   first spring means carried by said support structure normally biasing said capture members towards said releasing position,
   an elongated cam member positioned between the lower portions of said capture members and extending generally lateral to said pair of capture members, said cam member being supported for movement between interfering and non-interfering positions by said supporting structure, wherein in said interfering position said capture member is in said capturing position and in said non-interfering position said capture member is in asid releasing position,
   an elongated, generally upright lever member having one end connected to one end of said cam member and another end accessible to gripping by an operator, said lever member being carried by said supporting structure, said lever member being capable of movement between first and second positions wherein in said first position said cam member is in said interfering position and in said second position said cam member is in said non-interfering position,
   second spring means carried by said supporting structure for normally biasing said lever member towards said first and second positions;
   a ball member capable of being releasably captured in said hollow portions of said capture members, said ball member being capable of being fully rotated over 360 degrees,
   a connector member having one end connected to said ball member and extending outwardly from said support structure, said connector member being rotatable over 360 degrees with said ball member, a key lock member supported for rotational movement by said supporting structure, a pawl member integral with said key lock capable of movement between holding and non-holding positions, wherein in said holding position said pawl member holds said lever member in said first position, a key capable of being inserted into said key-lock member and operating said key lock member and said pawl member between said holding and non-holding positions, and a boat having side walls wherein said supporting structure is positioned in one of said side walls, and further including a base structure, said supporting structure being positioned in said base structure.

2. A system according to claim 1, wherein said connector member forms at least one aperture external of said support structure and of said at least one of said side walls.

3. A system according to claim 2, wherein said at least one aperture of said connector member is adapted to pass a tie rope, and further including a tie rope positioned in said at least one aperture.

4. A system according to claim 3, wherein said support structure includes a plurality of support structures and said one of said side walls includes two side walls, said plurality of support structures being positioned in said two side walls at spaced intervals adapted to hold a tied boat, each of said ball member and said connector member being a plurality of ball members and connector members positioned in said plurality of support structures, and said at least one aperture being a plurality of said at least one aperture, and further including a plurality of tie ropes positioned in said plurality of said at least one aperture, whereby a boat can be moored or secured for raising by tying the free ends of the rope to an object, said connector members being rotatable over 360 degrees.

5. A system according to claim 4 further includes end walls, said plurality of support structures also being positioned in said end walls.

6. A system according to claim 2, wherein said at least one aperture is capable of positioning an oar at a fulcrum portion of said oar, said portion forming an oar hole, said at least one aperture further including a pair of opposed pivot pin holes aligned with said oar hole, and a pivot pin positioned through said pivot pin holes and said oar hole so as to position said oar with said connector member, whereby said oar is able to rotate up and down about said pivot pin and are further able to be rotated over a 360 degree area with said ball member.

7. A system according to claim 6, wherein said support structure with said ball member and said connector member include two support structures ball members and connector members, said at least one side wall is two side walls, said one of said two support structures being positioned in each of said two side walls, and said oar is two oars connected to said two connector members, whereby said boat can be rowed.

8. A system according to claim 2, wherein said connector member has a pair of apparel ends, one end being connected to a wall, the other end being connected to said ball member, said connector member being generally normal to said wall, wherein said capture members can capture said ball member, whereby said boat is secured to said wall.

9. A system according to claim 8, wherein said connector member is a plurality of said connector members.

10. A system according to claim 1, wherein said connector member has an end portion opposed to said ball member, said end portion being secured to a flat surface, whereby said boat can be held by said connector member with said ball member being held by said pair of capture members in said support structure in said side wall of said boat.

11. A system according to claim 10, wherein said connector member includes a plurality of connector members and said pair of capture members includes a plurality of pairs of capture members mounted in a plurality of support structures, said one of side walls being a plurality of side walls.

12. A system according to claim 11, wherein said flat surface is the deck of a ship.

13. A system according to claim 11, wherein said flat surface is the wall of a structure.

* * * * *